United States Patent Office 2,881,566
Patented Apr. 14, 1959

2,881,566

TREATMENT OF GLASS SURFACES

Alfred E. Badger, Maumee, Ohio, assignor to Owens-Illinois Glass Company, a corporation of Ohio No Drawing. Application July 30, 1956
Serial No. 600,688

4 Claims. (Cl. 49—77)

The present invention relates to the treatment of the surfaces of molten glass by bringing such surfaces at elevated temperatures into contact with an atmosphere containing the vapor of a suitable volatile compound of silicon, such as for example, tetraethyl orthosilicate $(C_2H_5)_4SiO_4$. This compound will be referred to hereafter as "ethyl silicate," this being a commonly used term.

This application is a continuation-in-part of my copending application, Serial No. 624,937, filed October 26, 1945, Treatment of Glass Surfaces (now abandoned).

I have found that when the vapor of ethyl silicate is entrained in air and brought into contact with a molten glass surface at elevated temperatures, a chemical union occurs between the glass surface and the silicon contained in the vapor. The result of this chemical union is the enrichment of the glass surface with silica. Such a treated glass surface possesses increased resistance to solution in water and most acids. In other words the "chemical durability" of the glass is enhanced. No effect of the chemical union between the molten glass and the vapor of ethyl silicate is visible, but that such a union has occurred is proved by the results of chemical durability tests made on the finished glass.

Furthermore, it is essential that the vapor of ethyl silicate must contact the glass while the latter is in the molten state. The temperature of the glass which is necessary to produce a chemical union between the glass and the vapor will naturally depend upon the type of glass which is treated. To illustrate the range of glass temperatures necessary to effect the desired chemical union, a commercial soda-lime-magnesia-silica bottle glass was treated at various temperatures with the vapor of ethyl silicate entrained in air. The surfaces of different samples of this glass were treated at temperatures ranging from room temperature up to 2500° F. The periods of treatment varied from 3 to 60 seconds, which periods are feasible to incorporate in commercial glass-forming cycles.

The resulting samples all appeared to be clear and transparent and indistinguishable by eye from an untreated sample.

All of the samples were then placed in an autoclave for three hours using a steam pressure of 15 lbs., in order to provide a visual comparison of the attack on the glass surfaces. This method of comparing the chemical durabilities is widely used in the glass industry.

After removing the glass samples from the autoclave, it was observed that the glass samples which had been treated with ethyl silicate vapor at 1700° F., or below were covered with an iridescent film of corroded glass. Samples treated at 1800° or 1900° F., exhibited a lighter corrosion deposit. Samples treated at 2000–2500° F. showed no appreciable corrosion. The conclusion from these tests is that to enhance the surface durability of container-type glasses, a minimum glass temperature of approximately 1800° F. is necessary to produce an effective chemical union between the glass surface and the vapor from ethyl silicate.

Additional confirmation of the enhancement in chemical durability of a glass surface produced by the above means resulted from commercial tests in which the vapor of ethyl silicate was entrained in the blowing air of an Owens bottle making machine. Bottles produced in this test were filled with water and compared with a test lot of untreated bottles which had been made on the same machine at approximately the same time. After a suitable period the water was analyzed for alkali dissolved from the interior surfaces of the bottles, this being an ordinary test for measuring the durability of such types of commercial ware. The results of such tests showed a very marked increase in chemical durability of the bottles which had been blown in contact with ethyl silicate vapor. Since the temperature of the glass during blowing in the Owens process is about 2000° to 2200° F., which is above the minimum temperature of 1800° F. found in the laboratory tests, the attained increase in chemical durability was to be expected.

It has been stated previously that the minimum temperature at which chemical union occurs between ethyl silicate vapor and the molten glass surface would be somewhat dependent on the composition of the glass. This statement means that highly fluid glasses would tend to react at lower temperatures than more viscous glasses. To illustrate this effect, a vitreous enamel used for enameling on sheet iron was subjected to ethyl silicate vapor at various temperatures ranging from room temperature to 1800° F., the latter temperature being the approximate maximum in commercial use. Such vitreous enamels are extremely fluid glasses compared with ordinary commercial bottle glasses. After treatment with ethyl silicate vapor, all samples were immersed in a 10% aqueous solution of citric acid for 5 minutes. The samples were then washed and allowed to dry, after which the extent of corrosion due to the attack of citric acid on the surface was observed. This testing procedure is commonly used in the porcelain enameling industry as a measure of the chemical durability of enamels.

Results of these comparisons of chemical durability of vitreous enamels, which had been treated at various temperatures with ethyl silicate vapor, showed that all samples which had been treated from room temperature to 1100° F. showed marked attack by citric acid. Samples treated at 1200° F. showed a slight improvement in chemical durability. Samples treated at temperatures from 1300° to 1800° F., showed very marked improvement in chemical durability, there being no visible effects from immersion in the acid.

The conclusions from the above series of tests on a commercial bottle glass composition and on a commercial vitreous enamel composition are as follows:

The chemical durability of a bottle glass is markedly improved by treatment with ethyl silicate vapor, providing the glass temperature is from 1800° F. to 2500° F. and preferably at 2000° F. or above. Commercial glass-forming operations are usually carried out within this range of temperatures.

The chemical durability of a commercial vitreous enamel is enhanced if the treatment is performed at temperatures from 1200° to 1800° F. Commercial firing of enamels is usually performed at temperatures of approximately 1500° to 1700° F.

Treatment of glass surfaces at temperatures below those specified is ineffective for improving the chemical durability of the glass surfaces to any commercially warranted degree.

The present invention includes the use of certain volatile compounds supplying silicon, which is the major metallic constituent of durable glasses. The more desirable silicon compounds or groups of compounds include the silicic acid esters, silicones, alkyl and aryl silanes, etc., adapted to be vaporized and reacted in contact with hot surfaces of glass or the like, in the manner herein described, to form a silica-rich layer on such surfaces. The silicon tetrahalides are preferably not used because of the corrosive character of their vapors and their great susceptibility to hydrolysis. The incidental presence of water vapor results in hydrolysis of these halides and the deposition of silicic acid elsewhere before contact with the glass surface. Thus, the continual transport of silicon to the glass surface and the reaction between the glass with the latter and forms a transparent invisible reaction layer consisting of a glass higher in silica than that of the underlying glass and which may approach pure silica glass which is known to have admirable resistance to chemical attack. The remaining constituents of the decomposed ethyl silicate pass off in gaseous form. They comprise organic compounds, or, if oxidation occurs, $CO_2$ or $CO$ and $H_2O$, or a mixture of these with organic compounds.

Although the vapor of ethyl silicate may be applied to the glass in undiluted form, I have found that good results are obtained when some other gas is used as a vehicle to carry the vapor to the surface being treated surface accomplished by my invention, due to the low temperatures employed in their processes. The viscosity of the container-type glass which I have used in my invention varies from about 25,000 down to 200 poises in the effective temperature range of 1800° to 2500° F. At the relatively low temperatures employed by Littleton, the viscosity of this glass would be about 50 million poises and this high viscosity precludes the formation of a chemically durable reaction zone.

The viscosity of glass at Hyde's operating temperature is so enormous that it is not measurable.

Experiments have been made in the past on coating silica glass with a layer of transparent silica glass by introducing ground quartz sand into a high-temperature flame. The latter causes fusion of the quartz particles which are directed against a background consisting of blocks of silica glass. The General Electric Company applied this process to the manufacture of large disks used for reflecting telescopes.

More recently Hyde in his Patent 2,272,342, Feb. 10, 1942, introduces a vaporizable compound of silicon, which may be silicon tetrachloride or ethyl silicate, into a high-temperature flame and forms a coating of silica glass on a rigid mandrel.

In a similar fashion, Dalton et al. in their Patent 2,239,551, April 22, 1941, disclose a method to which they form a glass coating on a mandrel by introducing mixtures of volatile compounds of silicon, boron, and aluminum into a high-temperature burner.

All of these processes are similar in the general methods employed, in that ground sand or volatile compounds of silicon are fed through a high-temperature flame, and a "rain" of fused siliceous glass is deposited as a coating on a rigid mandrel or background. Flame temperatures are of the order of 3000° F. or higher which is sufficient to fuse $SiO_2$.

My invention is distinct from these prior art methods. At the glass temperatures of 1800° to 2500° F. which are advised for practicing the present invention, no fusion of silica can occur. The success of my process depends on the avidity with which a molten glass surface reacts with the vapor of ethyl silicate. Furthermore no distinct layer of silica glass or any other glass is formed, but rather a reaction zone consisting of high-silica glass. No distinct coating can be removed from the surface of glass produced by my invention, whereas coatings made by prior art methods can be scraped off by suitable means.

In practicing my invention, when used for applying a protective layer to the interior surfaces of blown glass articles, such as bottles, jars, and the like, I have found that ethyl silicate is well adapted for such use and greatly improves the durability and resistance to the chemical action of various substances which are ordinarily placed in such containers. The latter are generally made of soda-lime-silica glass, the major ingredients of the glass batch being silica, soda-ash and lime, often with appreciable amounts of feldspar. The vapor of the compound supplying the coating material, for example, ethyl silicate, may be mixed with the air by which the articles are blown. In Owens machines and other types of glass blowing machines, the vapor may be introduced into the air line through which air under pressure is supplied to the hollow parisons of glass for blowing them to finished form in the finishing molds.

Any suitable means may be employed for introducing the vapor into the pressure line. Various devices may be employed for such purpose. For example, a spray nozzle may be mounted inside of the blowing line so that the liquid comprising ethyl silicate may be sprayed into it. A carburetor type of device may be incorporated in the blow air line. If desired, the liquid may simply be run into the air line by application of pressure behind the body of liquid or by the introduction of blowing air behind the body of liquid as in a device called a "pressure oiler." In this latter instance, the liquid running down the pipe will be vaporized because of the temperature at which the blowing air is usually delivered to a forming machine, this being slightly over room temperature. Any other suitable means for introducing the vapor into the blowing air may be employed.

When the vapor of the volatile compound of silicon, mixed with the air under pressure, is subjected to the high temperature of the expanding molten glass within the mold, that is, as the vapor touches the hot glass surface, the high temperature of the glass causes a chemical union between the glass surface and the silicon contained in the vapor. This chemical combination may or may not involve oxidation when oxygen is present in the carrying gas or atmosphere. The silicon thus released forms a reaction zone of higher-silica glass, overlying and providing protection for the expanding interior surface of the article which is being blown, the surface layer consisting of a glass higher in silica than the underlying glass. This formation of a reaction zone takes place, at least to some extent, while the molten glass is still expanding and may continue after the article is fully expanded and while pressure or circulation of the blowing air is maintained. Owing to the high temperature of the molten glass, the chemical reaction by which the layer is produced takes place rapidly and without requiring the normal length of time of the blowing operation to be extended. The temperature of the glass during the blowing operation may range within 1800° to 2500° F., the temperature depending upon the formula of the glass batch and other variable factors.

Many types of vitreous enamels such as are applied to metal show low resistance to the attack of water, acids, and various fluids and solutions which, in practice, are brought in contact with the enamels. The durability of these enameled glasses, and glasses generally, is increased greatly by treatment in accordance with the present invention. Such treatment as applied to enameled ware may comprise, for example, the action of ethyl silicate vapor on the enameled surface. The vapor, or a mixture of the vapor in a suitable gas, is brought in contact with the molten enameled surface while the latter is at a high temperature (1200° to 1800° F.) most efficiently near the end of the firing operation. One method of such treatment consists in directing a series of jets of mixed air or other gas and ethyl silicate vapor against the hot glass surface. This application of the invention is of practical utility as applied, for example, to enameled hot water tanks, enameled cooking ware, and as a general substitute for so-called "acid-resisting" enameled ware.

When the invention is employed for the treatment of glass fibers, such as are at present used in the manufacture of textiles, glass wool and the like, the treatment may be effected as the glass fibers are drawn from the supply body of molten glass, by passing the fibers through an atmosphere containing a suitable concentration of ethyl silicate vapor.

The foregoing constitutes the essential portions of the specification of my copending application, S.N. 309,371, filed Sept. 12, 1952, and now abandoned, and of which this application is a continuation-in-part.

As previously stated therein the present invention is applicable to many glass articles and in particular is it applicable to articles made from the usual soda-lime-silica glasses. The term "soda-lime-silica glasses" as herein used, refers to glasses commonly designated in the glass art by this expression and comprises any glass coming within the following range of compositions:

|  | Percent |
|---|---|
| $SiO_2$ | 57–74 |
| $B_2O_3$ | 0–5 |
| $R_2O_3$ | 0–9.5 |
| RO | 8.5–15 |
| Alkalies | 10–18 |

The term $R_2O_3$ refers to the content of $Al_2O_3$ and $Fe_2O_3$ while the term RO indicates CaO and MgO and BaO.

Glasses made from compositions falling within the range of components set forth above will have annealing temperatures falling within the range of from about 990° F. to about 1020° F., and softening temperatures falling within the range of from about 1100° F. to 1400° F.

The chemical composition of the base glass is not per se a part of the present method which may be applied to any composition of molten glass, which can be heated to within the specified temperature range, where the glass becomes sufficiently fluid for the treatment to be effective. However, the invention is not limited to soda-lime-silica glasses as the surface areas of other compositions of glass are susceptible to silica enrichment such as the lead glasses. Lead glasses are considered to be those which for example, fall within the following range of compositions:

| | Percent |
|---|---|
| $SiO_2$ | 57–75 |
| $R_2O_3$ | 0–5 |
| RO | 0–35 |
| Alkalies | 10–18 |

The term $R_2O_3$ refers to content of $Al_2O_3$ and $Fe_2O_3$ while the term RO indicates CaO, MgO, BaO, and PbO. Glasses made from compositions falling within the range of components set forth above will have annealing temperatures falling within the range of from about 806° F. to about 977° F., and softening temperatures falling within the range of from 1000° F. to 1300° F.

In this present invention the actual mechanism of the formation of an increase or enrichment in the silica component of the surface areas of the articles is difficult if not impossible of explanation. However, it is a fact that the silica component does increase and such increase is of course directly related to the silicon composition being used, the amount being deposited, the temperature of the composition, and the temperature conditions of the receiving surface existing at the time of deposition.

This invention is not primarily directed to the deposition of a measurable film or coating, but is actually directed to increasing the amount of a specific metallic oxide by pyrolysis of a metallic compound upon the surface of a mass of glass for the purpose of enhancing the stability and resistance of the surfaces of the article made from that mass of glass. In particular, it is intended to increase the amount of any constituent metallic oxide which may be present in the original glass composition, such as the silica or alumina, or other oxides which increase the durability of the glass surface.

The invention includes the use of any suitable volatile compound supplying silica, alumina or other oxides which form constituents of durable glasses. The more desirable silicon compounds or groups of compounds include the silicic acid esters, silicones, alkyl and aryl silanes, etc., adapted to be vaporized and reacted in contact with hot surfaces of glass or the like, in the manner herein described, for applying silica or a silica-rich film to such surfaces.

Thus, through the use of the various metallic compounds while at approximate room or other desired temperatures, in a vaporized type of application to a vitreous surface, with said surface having a temperature in the range of approximately 1200° F. (650° C.) up to approximately 2500° F. (1370° C.), the oxide particles are converted from the metallic compound. They will and do become an integral part of the structure, or stated otherwise, the process consists of enriching the metallic oxide content of a vitreous surface through dissolution into said surface, by solution, the decomposition products of a metallic compound by and through the heat supplied by said surface. A temperature range of 1200° F. to 2500° F. is necessary because at temperatures in excess of 2500° F. the dissolution would be to a condition beyond surface enrichment where the mobility is so high as to permit an excess of penetration into the body of the liquid as distinguished from surface enrichment. Temperatures below 1200° F. are not conducive to dissolution. In other words, at temperatures below 1200° F., the mobility of the surface is too low to accept any desirable degree of dissolution thereinto. The preferred temperature of the glass of any specific composition is at least that at which the said glass may be worked or shaped such as by the pressing or blowing thereof.

Thus, by this invention the new surface of glass created by this process is invisible and consists of a gradation of high-oxide glass to the unchanged base glass. This is not a visible film of definite thickness, but is actually a layer of a high-oxide glass formed at a temperature sufficiently high as to become integral and continuous with the surface of the article ultimately formed therefrom.

This invention consists in controlling, for example, the chemical composition of the surface areas of the wall portions of ultimately shaped glass articles, regardless of whether these articles may be shaped by pressing, blowing, drawing, extruding, etc. As an example, the preliminary parison utilized in making blown containers, in which the inner glass portions may be at temperatures in excess of 1200° F., may be internally subjected to these ethyl silicate vapors while the parison is being blown to final form. Also, the external surface areas of these parisons may also be subjected to these vapors prior to their being blown and while at temperatures high enough to provide the reaction required to produce an enriched, integral high-silica surface continuous with and on the surface areas of the article as completed.

A further method of carrying out this present invention would be in connection with the feeding of charges of molten glass to a pressing mold. As one example, when the glass charge has been deposited in the mold and the pressing plunger is moving down into press position, the vapor of ethyl silicate may be projected into the space between the glass and press plunger and upon the exposed surface areas of the glass, thereby providing a vapor contact with the exposed surface areas of the charge. Thus, when the part is pressed the ultimately shaped inner surface areas of the pressed article will have the high-silica surface desired. Further, the charge may, in combination with the above, be sprayed on its exterior surface areas just prior to deposit in a mold, thus providing a situation wherein both the outer and inner surface areas of the ultimate article will have this integral and continuous high-silica surface.

Other methods of applying the vapors may be utilized and other glass or glass-like surfaces may be enriched, but in any event the application of such vapors must be upon a base glass surface, the temperature of which at the time of deposition is high enough to provide the reaction required to form said high-oxide or high-silica surface as an integral and continuous part of the base glass surface. Such temperature must be of an order which will permit working or shaping of the particular glass composition, whether it be a soda-lime-silica glass or a lead glass composition. Such temperatures must be at least in the range upwards from 1200° F. (650° C.) and not below the annealing temperature thereof.

Stated otherwise, it is most desirable that the metallic compound be applied to the surface to be enriched when said surface is in the temperature range existing between the point of being molten and the point of its reaching self-supporting stability or the softening point. The softening point as defined by Littleton and Lillie, in Journal of the Society of Glass Technology, volume 24, 176 (1940) and as accepted in the glass industry, "is that the temperature at which a fiber of glass, 9.25 inches long, of a diameter between 0.55 and 0.75 mm., suspended vertically in a furnace of specified characteristics, will elongate under its own weight at the rate of 1 mm. per minute. H. R. Lillie (ibid., 1931, 14, 502–511) has shown that under these conditions such a rate of extension takes place when the glass has a viscosity value of approximately $10^{7.6}$ poises." This definition is in common use in the United States. Under such conditions the surface of the glass for example, will definitely become highly oxide or silica-enriched and will not be electrically conductive. However, the surface areas so enriched will become highly resistant to attack by chemical agents in general, both liquid and gaseous and with improved physical characteristics.

For the purpose of clarification the term or expression "metallic compound" as used in the specification and claims, shall be construed to mean a volatile compound of any element whose oxide contributes durability to glasses. Such oxides include silica, alumina, etc. Such metallic compounds include ethyl silicate, silicon tetrachloride, aluminum isopropoxide, and titanium tetrachloride.

Modifications may be resorted to within the spirit and scope of the appended claims.

I claim:

1. A method for improving the durability of a glass surface by enriching said surface with an invisible silica zone which is integral and continuous with said surface comprising maintaining said surface at a temperature wherein said glass is plastic and may be worked, applying to said surface and pyrolizing thereon a vapor of ethyl silicate to form an integral and continuous invisible silica reaction zone on said surface, and then cooling said surface.

2. The method for improving the durability of a glass surface as defined in claim 1 wherein the temperature at which the glass is plastic and may be worked is within the range of 1800° F. to 2500° F.

3. The method for improving the durability of a glass surface as defined in claim 1 wherein said glass surface is a vitreous enamel and the temperature at which said enamel is plastic and may be worked is within the range of 1200° F. to 1800° F.

4. A method for improving the durability of a glass surface by enriching said surface with an invisible silica zone which is integral and continuous with said surface comprising maintaining said surface at a temperature wherein said glass is plastic and may be worked, applying to said surface and pyrolizing thereon a vapor of a silicon-containing compound to form an integral and continuous invisible silica reaction zone on said surface and then cooling said surface.

References Cited in the file of this patent

UNITED STATES PATENTS

| | | |
|---|---|---|
| 2,154,490 | Burch | Apr. 18, 1939 |
| 1,964,322 | Hyde | June 26, 1934 |
| 2,428,357 | Cohen | Oct. 7, 1947 |
| 2,442,976 | Heany | June 8, 1948 |